Patented May 22, 1934

1,959,346

UNITED STATES PATENT OFFICE 1,959,346

METHOD OF DECOLORIZING AND CLARIFYING MINERAL OILS AND OTHER LIQUIDS

Arthur B. Cummins, Plainfield, N. J., assignor to Celite Corporation, New York, N. Y., a corporation of New York No Drawing. Application December 18, 1931, Serial No. 581,997

7 Claims. (Cl. 87—12)

The present invention relates to a method of decolorizing liquids particularly non-aqueous liquids such as mineral oil, vegetable oil and the like with synthetically prepared, insoluble, hydrous silicates characterized by a structure which renders them highly adsorbent of coloring material suspended or dissolved in such liquids.

In the refining processes applied to the majority of non-aqueous liquids and solutions, it is necessary to remove certain dissolved or colloidal substances which, when present, are detrimental to the appearance, color, odor and, in edible fats and oils, the taste.

As a matter of economy in some cases and, as a necessity in others, the removal of the types of impurities referred to above has been accomplished either entirely or in part by the use of an adsorbing agent such as fuller's earth or acid treated natural clays such as the sub-bentonites. In the case of mineral oils, the adsorption step is usually preceded by treatment with sulfuric acid or extraction with liquid sulfur dioxide. The actual contact between the adsorbing agent and the oil is either obtained by percolation through a bed of the solid or by mixing the solid directly with the oil in the form of a fine powder. The first of these methods is known as "percolation filtration" while the latter has been designated in the industry as "contact filtration". The process herein disclosed is applicable directly to the "contact" method although not necessarily confined to this method.

The adsorptive and decoloring capacity of substances has been ascertained to be largely dependent upon their physical structure. For instance, compounds identical in chemical composition will vary widely in their effectiveness as decolorizers. The precise character of the structure necessary to render a compound an efficient decolorizing agent and the exact nature of the mechanism of the decolorizing reaction is not known. Consequently it is not possible to formulate generalizations regarding the comparative decolorizing effectiveness of compounds based upon chemical similarity or any of the usually known properties. Certain naturally occurring magnesium silicates for instance have been found to possess a fair degree of effectiveness for use as decolorizing agents whereas other types of magnesium silicates apparently similar in chemical composition and other properties exhibited very little effectiveness in this respect.

The present invention involved the discovery that certain types of synthetically prepared insoluble hydrous silicates were highly efficient decolorizing agents particularly for non-aqueous liquids such as mineral oil and the like. The specific character and method of preparing these silicates employed according to the invention is set forth in detail hereinafter.

In the method provided by the invention the liquid to be treated is brought into intimate contact with a synthetic insoluble hydrous silicate having high adsorbent characteristics at an elevated temperature and thereafter the silicate is separated from the liquid together with the adsorbed impurities by filtration or other suitable means. In its more specific aspects the invention contemplates particularly a treatment with hydrous magnesium silicates which consist of reaction products of sparingly soluble precipitated basic magnesium compounds and silica particularly highly reactive silica such as diatomaceous earth.

The latter method offers a number of distinct advantages in that the hydrous magnesium silicate used is more efficient in the majority of cases than any known material which is available to the industries utilizing a product of this type. For example, when used on relatively dark petroleum oils by the contact method, a synthetic hydrous magnesium silicate gel of the character described above has been shown to be 20-25% more efficient than the best available acid treated clay. Also, the process utilizing such a hydrous magnesium silicate will, in general, result in smaller quantities of adsorbed material for the production of a given color due to the fact that the action is one of adsorption without appreciable polymerization. Through the adjustment of the moisture content of the magnesium silicate, it is possible to maintain a high efficiency over a wide range of contacting temperatures. Also, it is possible to successfully revivify a gel of this type to 80-90% of its original efficiency through combustion of the adsorbed organic material which has been adsorbed.

Further features and advantages of the invention will be apparent from the following detailed description of an illustrative embodiment.

As an illustration, it will be assumed that a heavy petroleum oil is to be treated by adsorption with a hydrous magnesium silicate. It will also be assumed that this oil is substantially neutral and therefore, will be treated with a gel which contains no free alkali. Also, the oil is of such a nature that it can be heated to 400° F. economically and without detriment to its quality.

In this case, the preferred method involves intimately mixing a synthetic hydrous magnesium silicate containing about 6-20% water in finely divided form with the oil to be treated in predetermined proportion to give the desired color on the finished product, heating the slurry rapidly in a pipe heater to 400° F., allowing the moistuer to vaporize under substantially atmospheric pressure in a suitable drum or tank, filtering the slurry to remove the spent adsorbent, (passing the filtrate through an exchanger against the cold slurry to be heated), steaming the filter cake in order to remove entrained oil, washing the cake with a suitable solvent for the final removal of entrained oil, vaporizing the solvent from the cake by means of direct steaming, transferring the steamed cake from the filter to a revivifying furnace in which the adsorbed coloring matter is eliminated by actual combustion in the presence of oxygen at a temperature suitable for burning of the adsorbed organic matter, for example about 850° to 950° F., cooling the revivified adsorbent and introducing the material into fresh oil to be treated.

The wash solution containing oil and solvent is heated and the solvent removed by distillation. The oil may be a finished product and be handled as such or, if appreciable quantities of the adsorbed material has been dissolved by the solvent, this oil should be recycled through the system.

The synthetic hydrous magnesium silicates employed in accordance with the invention preferably contain more than 3% of water. Specifically the invention contemplates the use of synthetic magnesium silicates prepared by the reaction of a precipitated basic magnesium compound and finely divided silica or siliceous material particularly highly reactive silica such as diatomaceous silica, the proportions in the reaction product being in the range of molecular ratios of .3 to 1.0 $MgO-SiO_2$. As a typical example, a highly efficient product can be obtained by reacting precipitated basic magnesium carbonate with diatomaceous earth using a molecular proportion of .5, the reaction being carried out in a .6N sodium carbonate solution in the proportion of .6 gallon of solution to one lb. of solids. The slurry is boiled with mechanical agitation for 3 hrs., the hydrous silicate filtered from the alkaline solution, washed with water, reslurried in water, neutralized to litmus with dilute $H_2SO_4$, filtered, washed, dried to the quantity of water consistent with its use, and milled. A silicate prepared in this manner is extremely efficient as a discolorizing material as a result of its physical and chemical structure since the physical structure is controlled by that of the precipitated magnesium compound used and the potential bonds necessary for efficient adsorption are supplied by the water of hydration. The silicate may be described as a pseudomorph of the particular magnesium compound employed.

In general, the adsorbents employed in accordance with this invention may be produced by forming a slurry or suspension of a finely divided carbonate of an alkaline earth metal in water, (such slurry or suspension being sufficiently thin or mobile to permit the reaction to take place and the slurry agitated or pumped), adding a finely divided siliceous material to such slurry or suspension, and then subjecting the mixture to the action of heat for a time sufficient to permit the reaction to reach substantial completion.

During such reaction, carbon dioxide is given off and may either be discharged, collected or returned for use in any suitable manner. After such heat treatment, the slurry or suspension is filtered, settled or otherwise treated so as to separate therefrom the reaction products which will be found to consist of particles of a hydrated silicate. These reaction products may be water washed and dried, practically only the free moisture being removed, leaving in such product a content of from about 5% to 35% of water.

Of the compounds of the alkaline earth metals, magnesium compounds and in particular magnesium carbonates have been found to produce the most desirable adsorbents. Furthermore, it has been found that precipitated magnesium compounds particularly basic magnesium carbonate or other precipitated forms of magnesium carbonate, are much more effective than ordinary magnesite (naturally occurring magnesium carbonate). The precipitated magnesium compounds and in particular the precipitated forms of magnesium carbonates have a much more desirable structure and products produced therefrom in accordance with this invention apparently consist of a skeletal form of the magnesium compound having surfaces composed of hydrated magnesium silicate. The term "precipitated" is employed herein in the usual commercial sense to imply a light weight material having a specific surface relatively high compared to the material from which it is prepared. The product, furthermore, may be termed a pseudomorph of magnesium silicate after the particular magnesium compound employed and appears to contain in some instances a portion of the magnesium compound in a very porous matrix of hydrous magnesium silicate gel.

Although magnesium carbonates made in any desired manner from any desired or suitable material can be used, (such as magnesium oxide, dolomite, natural magnesium hydroxide or brucite, etc.), it may be stated that the preferred method comprises calcining magnesite to form the oxide, grinding the oxide (dry or with water to form a slurry), hydrating such oxide with water and then completely carbonating to form the soluble bicarbonate ($Mg(HCO_3)_2$) and heating the same to precipitate either a normal or basic magnesium carbonate. The chemical composition of basic magnesium carbonate need not be given as not only may it vary appreciably but furthermore no definite composition can be attributed thereto.

In place of completely carbonating the oxide and then precipitating the desired carbonate as in the foregoing, the oxide may be only partially carbonated to either the normal or basic carbonate stage. However this procedure is not the preferred procedure since the carbonate thus formed does not have as desirable a structure.

The structure of the basic carbonate made in accordance with the above procedure will vary somewhat in accordance with specific conditions such as the temperature employed and the like. In general, it may be stated that the reacting conditions are preferably such as to result in the formation of a product of low dry bulk density. A basic magnesium carbonate of similar characteristics to that commonly utilized in heat insulation, for instance, constitutes a satisfactory material for use in my invention. The difference in structure between such material and magnesite both natural and calcined is indicated by a comparison of their bulk densities as follows:

Crude magnesite_____ 35.5 #/cu. ft.
Calcined magnesite_____ 41.3 #/cu. ft.
Basic magnesium carbonate_____ 7.5 #/cu. ft.

The silica for this reaction may be derived from a number of sources. Siliceous clays may be employed but preferably contaminating materials such as aluminum or iron silicates found in nature should not be present in excessive amounts. Finely ground sand may be used but silica having a relatively high specific surface and of consequent high reactivity as exemplified by diatomaceous material such as diatomite, diatomaceous earth, or other forms of amorphous or opaline silica, are to be preferred. In this connection, it may be stated that the siliceous materials employed in the slurry are preferably ground or disintegrated so as to pass at least a 20 mesh sieve and preferably to pass a 100 mesh sieve.

It has been found that in the preparation of silicates from magnesium compounds and in particular from normal or basic magnesium carbonate and a siliceous material, the ingredients should be used in proportion sufficient to give a molal ratio in the product of MgO to $SiO_2$ of between about 0.2–1.2 to 1.0 in order to provide the desired degree of adsorptive quality in the product. Apparently the most effective molal ratio of MgO to $SiO_2$ for this purpose lies between 0.4–0.75 to 1.

In making the slurry or suspension of the magnesium compound and finely divided siliceous material, it is desirable to employ a sufficient amount of water to form a slurry sufficiently fluid to permit agitation preferably by boiling and pumping so that it may be readily conveyed from mixers to digesters, etc. Ordinarily from about 0.4 gallon to 1 gallon of water per pound of solids is sufficient.

The slurry produced as above described is heated until the reaction between the magnesium compound and silica is substantially complete. In general heating of the reaction mixture should be continued to a stage when magnesium silicate is formed to the extent of at least 50% of the quantity of the magnesium compound present. Completion of the reaction to the desired extent may ordinarily be accomplished by subjecting the slurry to sufficient heat to cause boiling under atmospheric pressure for from about 4 to 24 hours. The time will vary among other factors with the reactive character of the siliceous material present. When a pressure of about 100 pounds per square inch and a corresponding high temperature are employed during the digestion of the slurry, it has been found that from ½ to 1½ hours only are required, particularly when a highly reactive siliceous material such as diatomaceous silica is employed. Pressures of 200 to 1,000 pounds per square inch with corresponding high temperatures may be employed if desired. Whether atmospheric pressure or superatmospheric pressure is employed, is dependent upon economic plant operating conditions.

When superatmospheric pressures are used, the carbon dioxide liberated during the reaction may be removed from the digestion kettle during the course of the reaction by means of pressure relief valves to progressively favor the decomposition of the carbonate. In the reaction between a magnesium carbonate and silica, the carbon dioxide is evolved proportionately to the silica entering into chemical combination with the magnesia in accordance with the chemical equilibrium of such reaction. It is evident that the progress of such reaction is dependent upon the continuous or intermittent release of the carbon dioxide at a pressure below the equilibrium pressure. Carbon dioxide so released can, of course, be utilized in the manufacture of basic magnesium carbonate or in any other suitable manner. For instance the carbon dioxide may be liquefied without substantially lowering the pressure at which it is withdrawn from the reaction vessel.

After the slurry has been digested for the requisite time, the aqueous medium may be separated from the solid reaction products which will be found to be in finely divided form. The separation of the aqueous medium from the digested slurry may be accomplished in any suitable manner but filtration, and particularly continuous filtration as by means of cylindrical, rotary filters, is preferred. The product is then dried in the air at room temperatures, or under vacuum at a temperature of about 150° F., or at a temperature not exceeding about 250° F. In order to produce the optimum adsorbent, it is necessary that the product contain not less than about 10% of combined water. The upper limit for the combined water content is not particularly important with respect to the decolorizing effect. However economic reasons such as excessive weight of the product which increases shipping costs render it advisable to maintain this upper limit reasonably low and about 25% may be set as the desirable upper limit. Hydrated magnesium silicates made from basic magnesium carbonate by the method of this invention, should preferably contain not less than about 15% of combined water. The above ranges of moisture content may include a small proportion of free water which was left in the product. Effective adsorbents can be produced, however, with a residual moisture content as low as 3%.

In order to accelerate the interaction of the magnesium compound and the silica it has been found advisable in most instances to provide a certain amount of a suitable alkali such as sodium carbonate in the reaction mixture which functions a silica carrier, probably in accordance with the following illustrative equations:—

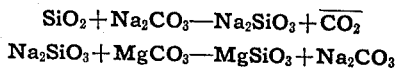

$$SiO_2 + Na_2CO_3 \rightarrow Na_2SiO_3 + \overline{CO_2}$$
$$Na_2SiO_3 + MgCO_3 \rightarrow MgSiO_3 + Na_2CO_3$$

The alkali undergoes no permanent change during the reaction and may be recovered for re-use in subsequent batches. Its concentration in the reaction mixture should be kept below 2N and preferably in the range of 0.5N to 0.25N.

After drying, the product may be milled, either lightly to break up agglomeration, or reduced to a very fine state of division, depending upon the use to which the product is to be put. In employing the product in accordance with the invention, it has been found generally desirable to mill it only sufficiently to pass about 100 mesh, finer subdivision or removal of coarse particles apparently not materially affecting its adsorptive characteristics.

The synthetic hydrous silicates above described are peculiar with respect to the efficiency and ease with which they can be revivified. Whereas it is extremely difficult to revivify the more common acid treated clays to an efficiency greater than 75% of the original by burning out the adsorbed color from mineral oils and the like, it has been found that a hydrous magnesium silicate when carefully heated to elevated temperatures suitably between 850 and 950° can be revivified to 90% of its original efficiency and this can be maintained on subsequent burnings. If a temperature of about 1000° F. is exceeded, however, the efficiency of the revivified material is decreased due probably to partial fusion of the surface structure. At temperatures below about 850° F., complete removal of carbon becomes very difficult.

What I claim is:

1. A method of decolorizing liquids which comprises intimately contacting therewith the reaction product of silica and a sparingly soluble basic magnesium compound of a higher degree of basicity than magnesite, the molal ratio of MgO to $SiO_2$ in the reaction product being between about 0.2–1.2 to 1.0 and at least 50% of the magnesia content being in the combined form of magnesium silicate, maintaining the mixture in contact at the temperature of the decolorizing reaction, and then separating the silicate and adsorbed coloring material from the liquid.

2. A method of decolorizing liquids which comprises intimately contacting therewith a porous insoluble hydrous magnesium silicate comprising the reaction product of silica and a sparingly soluble basic magnesium compound of a higher degree of basicity than magnesite, maintaining the mixture in contact at the temperature of the decolorizing reaction, and then separating the silicate and adsorbed coloring material from the liquid.

3. A method of decolorizing non-aqueous liquids which comprises intimately contacting therewith a porous insoluble hydrous magnesium silicate, said silicate being a pseudomorph after a sparingly soluble basic magnesium compound of a higher degree of basicity than magnesite, maintaining the mixture in contact at the temperature of the decolorizing reaction, and then separating the silicate and adsorbed coloring material from the liquid.

4. A method of decolorizing non-aqueous liquids which comprises intimately contacting therewith a porous insoluble hydrous magnesium silicate, said silicate being a pseudomorph after a precipitated sparingly soluble basic magnesium compound, said compound being of a higher degree of basicity than magnesite and having a relatively low dry bulk density, maintaining the mixture in contact at the temperature of the decolorizing reaction, and then separating the silicate and adsorbed coloring material from the liquid.

5. A method of decolorizing non-aqueous liquids which comprises intimately contacting therewith a porous insoluble hydrous magnesium silicate, said silicate being a pseudomorph after a sparingly soluble basic magnesium carbonate of a higher degree of basicity than magnesite, maintaining the mixture in contact at the temperature of the decolorizing reaction, and then separating the silicate and adsorbed coloring material from the liquid.

6. A method of decolorizing non-aqueous liquids which comprises intimately contacting therewith a porous insoluble hydrous magnesium silicate, said silicate being a pseudomorph after a precipitated sparingly soluble basic magnesium carbonate of a higher degree of basicity than magnesite, maintaining the mixture in contact at the temperature of the decolorizing reaction, and then separating the silicate and adsorbed coloring material from the liquid.

7. A method of decolorizing non-aqueous liquids which comprises intimately contacting therewith a porous insoluble hydrous magnesium silicate, said silicate being the reaction product of a sparingly soluble basic magnesium compound of a higher degree of basicity than magnesite, and diatomaceous silica, maintaining the mixture in contact at the temperature of the decolorizing reaction, and then separating the silicate and adsorbed coloring material from the liquid.

ARTHUR B. CUMMINS.